US012723108B2

(12) United States Patent
Wang et al.

(10) Patent No.: US 12,723,108 B2
(45) Date of Patent: Sep. 1, 2026

(54) OLEFIN POLYMERIZATION METHOD AND SYSTEM

(71) Applicants: CHINA PETROLEUM & CHEMICAL CORPORATION, Beijing (CN); Zhejiang University, Hangzhou (CN); SHANGHAI RESEARCH INSTITUTE OF CHEMICAL INDUSTRY CO. LTD., Shanghai (CN)

(72) Inventors: Jingdai Wang, Hangzhou (CN); Jingyuan Sun, Hangzhou (CN); Zhengliang Huang, Hangzhou (CN); Yongrong Yang, Hangzhou (CN); Guodong Han, Tianjin (CN); Wenqing Wu, Tianjin (CN); Binbo Jiang, Hangzhou (CN); Xiaofei Wang, Tianjin (CN); Yao Yang, Hangzhou (CN); Xiaofeng Ye, Shanghai (CN); Zuwei Liao, Hangzhou (CN)

(73) Assignees: CHINA PETROLEUM & CHEMICAL CORPORATION, Beijing (CN); Zhejiang University, Hangzhou (CN); SHANGHAI RESEARCH INSTITUTE OF CHEMICAL INDUSTRY CO. LTD., Shanghai (CN)

( * ) Notice: Subject to any disclaimer, the term of this patent is extended or adjusted under 35 U.S.C. 154(b) by 929 days.

(21) Appl. No.: 17/598,410

(22) PCT Filed: Mar. 9, 2020

(86) PCT No.: PCT/CN2020/078435
§ 371 (c)(1),
(2) Date: Sep. 27, 2021

(87) PCT Pub. No.: WO2020/192402
PCT Pub. Date: Oct. 1, 2020

(65) Prior Publication Data

US 2022/0177609 A1 Jun. 9, 2022

(30) Foreign Application Priority Data

Mar. 27, 2019 (CN) ......................... 201910235378.2

(51) Int. Cl.
*C08F 2/34* (2006.01)
*B01J 8/18* (2006.01)
(Continued)

(52) U.S. Cl.
CPC .................. *C08F 2/34* (2013.01); *B01J 8/18* (2013.01); *C08F 2/001* (2013.01);
(Continued)

(58) Field of Classification Search
CPC ............................... C08F 2/001; C08F 210/16
See application file for complete search history.

(56) References Cited

U.S. PATENT DOCUMENTS 7,115,687 B2 10/2006 Vuorikari et al.
2015/0080533 A1* 3/2015 Nguyen ................. B01J 19/002
525/240

FOREIGN PATENT DOCUMENTS

CN 101671405 A 3/2010
CN 102060943 A 5/2011
(Continued)

OTHER PUBLICATIONS

CN 105199031A, Dec. 2015, machine translation (Year: 2015).*
(Continued)

*Primary Examiner* — Catherine S Branch

(57) ABSTRACT

The present application relates to an olefin polymerization method and system in the field of olefin polymerization. The method combines a supported dual catalysts with a series
(Continued)

process, introduces a liquid material obtained after heat exchange and gas-liquid separation of a circulation gas flow into a separate first reactor to get into contact with the supported dual catalysts for polymerization reaction, and then introduces the reaction material and the first polyolefin generated by reaction into a second reactor to continue polymerization reaction, thereby enabling particles to circulate between first reactor and second reactor, improving mixing effect of two polyolefins with obvious differences in properties, avoiding the occurrence of phase separation, and facilitating the production of polyolefins with excellent performance. At the same time, ethylene gas is introduced into first reactor to further reduce the hydrogen/ethylene ratio, increase the molecular weight of polyethylene and improve the product performance.

13 Claims, 5 Drawing Sheets

(51) Int. Cl.

| | |
|---|---|
| ***C08F 2/00*** | (2006.01) |
| ***C08F 4/659*** | (2006.01) |
| ***C08F 210/16*** | (2006.01) |
| ***C08L 23/0807*** | (2025.01) |

(52) U.S. Cl.

CPC ........ *C08F 4/65912* (2013.01); *C08F 210/16* (2013.01); *C08L 23/0815* (2013.01); *B01J 2208/00017* (2013.01); *B01J 2208/00539* (2013.01); *B01J 2219/0004* (2013.01); *B01J 2219/00096* (2013.01); *C08L 2314/02* (2013.01); *C08L 2314/06* (2013.01)

(56) References Cited

FOREIGN PATENT DOCUMENTS

| | | | | |
|---|---|---|---|---|
| CN | 105199031 | | * 12/2015 | |
| CN | 105199031 | A | * 12/2015 | |
| CN | 103304692 | B | 3/2016 | |
| CN | 108350101 | A | 7/2018 | |
| EP | 0574821 | A2 | 12/1993 | |
| EP | 0691353 | A1 | 1/1996 | |
| JP | 2002003508 | A | 1/2022 | |
| WO | 2018/046395 | | * 3/2018 | ................ C08F 2/01 |

OTHER PUBLICATIONS

International search report of PCT Patent Application No. PCT/CN2020/078435 issued on Jun. 8, 2020.

Extended European Search Report of European Patent Application No. 20778888.6 issued on Nov. 29, 2022.

* cited by examiner (b)

(a)

OLEFIN POLYMERIZATION METHOD AND SYSTEM

CROSS-REFERENCE TO RELATED PRESENT APPLICATIONS

The present application claims the priority of Chinese patent application CN201910235378.2 filed on Mar. 27, 2019 and entitled "Olefin Polymerization Method and System", the entire contents of which are incorporated herein by reference.

FIELD OF THE INVENTION

The present application belongs to the field of olefin polymerization, and particularly relates to an olefin polymerization method and system.

BACKGROUND OF THE INVENTION

It is known in the art that expanding the molecular weight distribution of polyethylene can improve the rheological properties while maintaining the mechanical properties of the final product; the high molecular weight part ensures the mechanical properties of the product, while the low molecular weight part helps to improve the processability of the product. For polyolefins, especially polyethylene, the molecular weight and molecular weight distribution greatly affect the mechanical properties and processability of polymers. In the research in this field, it has been recognized that the higher the molecular weight of polyolefin, the higher the mechanical properties. However, polyolefin with high molecular weight has poor fluidity, which is difficult to process, and is difficult to blow and extrude at high shear rate.

It has been established in the field that polyethylene with wide/bimodal distribution can be produced by placing catalyst or polymer with active center in two or more different reaction conditions or gas compositions and making them react continuously. Using double series reactors or multiple series reactors, polymers with different molecular weights can be formed by olefin polymerization at different reaction temperatures or gas compositions, and polymers with bimodal or broad molecular weight distribution can be formed by olefin polymerization.

European patent EP-A-691353 describes a production method of wide/bimodal polyethylene by two traditional gas phase reactors in series, which causes some problems, though, such as cross-flow of reactants between two gas-phase reactors, continuous reaction of polymer and reaction materials in the transmission pipeline, resulting in pipeline blockage and so on. U.S. Pat. No. 7,115,687B discloses a process in which a first loop reactor and a second gas-phase fluidized bed reactor are connected in series. There are some problems in this process, such as uneven residence time distribution of polymer particles in two gas-phase reactors and a large amount of fine resin powder produced in the first reactor. Chinese patent CN 102060943A discloses a method for preparing bimodal polyethylene and a gas phase reactor comprising at least four fluidized beds. This method has the problems of complex operation method, high equipment investment and so on.

Therefore, there is an urgent demand to provide a new olefin polymerization method to obtain olefin polymers with wide molecular weight distribution, good compatibility and excellent properties.

SUMMARY OF THE INVENTION

Aiming at the defects of the prior art, the present application provides an olefin polymerization method, which is suitable for multi-component copolymerization systems such as homopolymerization, binary copolymerization and ternary copolymerization, and olefin homopolymerization and/or copolymerization is catalyzed in two polymerization reactors by supported dual catalysts, respectively, so as to obtain polyolefin products with wide molecular weight distribution, wide branching degree distribution, good compatibility and excellent performance. Meanwhile, the present application also provides a system for implementing the method.

To this end, a first aspect of the present application provides an olefin polymerization method, which comprises the following steps:

- S1, compressing and condensing circulation gas flow comprising an olefin and a condensing agent exported from an outlet of a second reactor to obtain a gas-liquid mixture; carrying out gas-liquid separation of the gas-liquid mixture to obtain a gas material and a liquid material, wherein the liquid material comprises a first liquid material and a second liquid material having the same or different compositions;
- S2, conveying the gas material and the first liquid material back to the second reactor for circulation, introducing the second liquid material into a first reactor, simultaneously conveying ethylene and a catalyst into the first reactor, and polymerizing the olefin in contact with the catalyst in the first reactor to form a mixture comprising a first polyolefin;
- S3, leading out the mixture comprising the first polyolefin from the first reactor and separating the mixture into at least a first mixture and a second mixture having the same or different compositions; conveying the first mixture back into the first reactor after heat exchange, and pumping the second mixture into the second reactor; and
- S4, performing polymerization reaction of the olefins in the second mixture, the gas material and the first liquid material in the second reactor where the olefins are in contact with the catalyst to generate a second polyolefin thereby forming a polymerization product comprising the first polyolefin and the second polyolefin.

In some embodiments of the present application, the circulation gas flow further comprises one or more of a cocatalyst, a molecular weight regulator, an antistatic agent, and an inert gas.

In other embodiments of the present application, in the polymerization process, a feeding position of polymerization raw materials including the olefin, the condensing agent, the cocatalyst, the molecular weight regulator, the antistatic agent and the inert gas is one or more of the first reactor, the second reactor, and gas circulation loop; and the gas circulation loop is located between the second reactor and a compressor, and the compressor is used for compressing the circulating gas flow.

In some embodiments of the present application, the catalyst is a supported dual catalysts; preferably, the supported dual catalysts is a mixture of metallocene or late transition metal catalyst and a Ziegler-Natta catalyst; further preferably, the mass ratio of the metallocene or late transition metal catalyst to the Ziegler-Natta catalyst is 0.1-10.

In other embodiments of the present application, in step S1, the content of liquid phase in the gas-liquid mixture is 5-50 wt %, preferably 10-25 wt %.

In some embodiments of the present application, in step S1, the second liquid material accounts for 30-100 wt % of the liquid material.

In other embodiments of the present application, in step S2, the ratio of the mass of ethylene conveyed into the first reactor to the total mass of polyolefin produced in the first reactor and the second reactor is 0.0001-1.

In some embodiments of the present application, the mass ratio of the first polyolefin to the second polyolefin is (0-3): 7 or (1-7): 3.

In other embodiments of the present application, in the first reactor reaction pressure is 1.0-10 MPa and reaction temperature is 40-100° C.; and/or in the second reactor reaction pressure is 0.5-9.5 MPa and reaction temperature is 60-120° C.

In some embodiments of the present application, the olefin is at least one of ethylene and α-olefin; preferably, the α-olefin is one or more of $C_4$-$C_{18}$ α-olefin; further preferably, the α-olefin is selected from the group consisting of butene, hexene, and octane.

In other embodiments of the present application, the condensing agent is selected from the group consisting of $C_4$-$C_8$ straight-chain or branched-chain alkanes, and $C_4$-$C_8$ cycloalkanes; preferably the condensing agent is selected from the group consisting of n-pentane, i-pentane, n-hexane, cyclohexane, and n-heptane.

In some embodiments of the present application, the cocatalyst is selected from the group consisting of modified aluminoxane, monochlorodiethyl aluminum, monochlorodiisobutyl aluminum, monochlorosesquiethyl aluminum, diisobutyl aluminum, dichloromonoethyl aluminum, trimethyl aluminum, triethyl aluminum, triisobutyl aluminum, trioctyl aluminum, monohydrodiethyl aluminum, and monohydrodiisobutyl aluminum; preferably triethylaluminum and/or triisobutyl aluminum.

In other embodiments of the present application, the antistatic agent is selected from the group consisting of aluminum distearate, ethoxylated amine, polysulfone copolymer, polymeric polyamine, and oil-soluble sulfonic acid.

In some embodiments of the present application, the gas at the top of the first reactor is discharged and returned to the gas circulation loop, when the pressure in the first reactor is higher than a predetermined pressure, wherein the gas circulation loop is located between the second reactor and the compressor, and the compressor is used for compressing the circulation gas flow.

In other embodiments of the present application, the polymerization product comprising the first polyolefin and the second polyolefin is continuously or intermittently discharged from the second reactor.

In a second aspect of the present application, there is provided a system for implementing the method according to the first aspect of the present application, which includes:

- a first reactor and a second reactor for olefin polymerization, wherein a compressor, a first heat exchanger and a gas-liquid separator are sequentially arranged between an outlet at the top of the second reactor and a first top inlet of the first reactor;
- an liquid outlet of the gas-liquid separator is connected with the first top inlet of the first reactor through a fluid pipeline; a gas outlet of the gas-liquid separator is connected with a bottom inlet of the second reactor through a fluid pipeline;
- the first top outlet of the first reactor is respectively connected with a middle inlet of the second reactor and a second top inlet of the first reactor.

In some embodiments of the present application, a feed pump is arranged between the first top outlet of the first reactor and the middle inlet of the second reactor for pumping a second mixture discharged from the first reactor into the second reactor.

In other embodiments of the present application, a second heat exchanger is arranged between the first top outlet of the first reactor and the second top inlet of the first reactor.

In some embodiments of the present application, the outlet at the top of the second reactor is connected with the compressor through a gas circulation loop.

In other embodiments of the present application, an inlet is provided at the middle part of the first reactor for conveying ethylene and a catalyst.

In some embodiments of the present application, an outlet is provided at the bottom of the second reactor for discharging polymerization products.

In other embodiments of the present application, the second top outlet of the first reactor is connected with the gas circulation loop, which is used for discharging the gas at the top of the first reactor and returning the gas to the gas circulation loop when the pressure in the first reactor is too high.

In some embodiments of the present application, the first reactor is a stirred tank reactor.

In some other embodiments of the present application, the second reactor is a fluidized bed reactor; and preferably, a gas distribution plate is arranged at the bottom of the second reactor.

In some embodiments of the present application, the first heat exchanger and the second heat exchanger are independently selected from a jacket heat exchanger, a shell-and-tube heat exchanger, or a plate heat exchanger.

In other embodiments of the present application, the gas-liquid separator is selected from a buffer tank separator, a cyclone separator, or a cyclone separator.

The present application has the beneficial effects that: in the method disclosed by the present application, the supported dual catalysts is combined with a series process, liquid materials obtained by condensing the circulation gas flow are separated and then introduced into a separate first reactor to contact with the supported dual catalysts for polymerization, and then materials comprising a first polyolefin generated by the reaction are introduced into a second reactor to continue polymerization with other materials in the second reactor, allowing polyolefin particles to circulate between the first reactor and the second reactor, improving the mixing effect of two polyolefins with obvious discrepancy in properties, so as to avoid phase separation, and facilitate production of olefin polymers with wide molecular weight distribution, good compatibility and excellent performance. At the same time, ethylene gas is introduced into the first reactor to reduce the hydrogen/ethylene ratio, increase the molecular weight of polyethylene and improve the product performance.

BRIEF DESCRIPTION OF DRAWINGS

The present application will be described in detail with reference to the accompanying drawings. It should be understood that the drawings are provided only for better understanding of the present application, and they should not be construed as limiting the present application.

Figure 1:
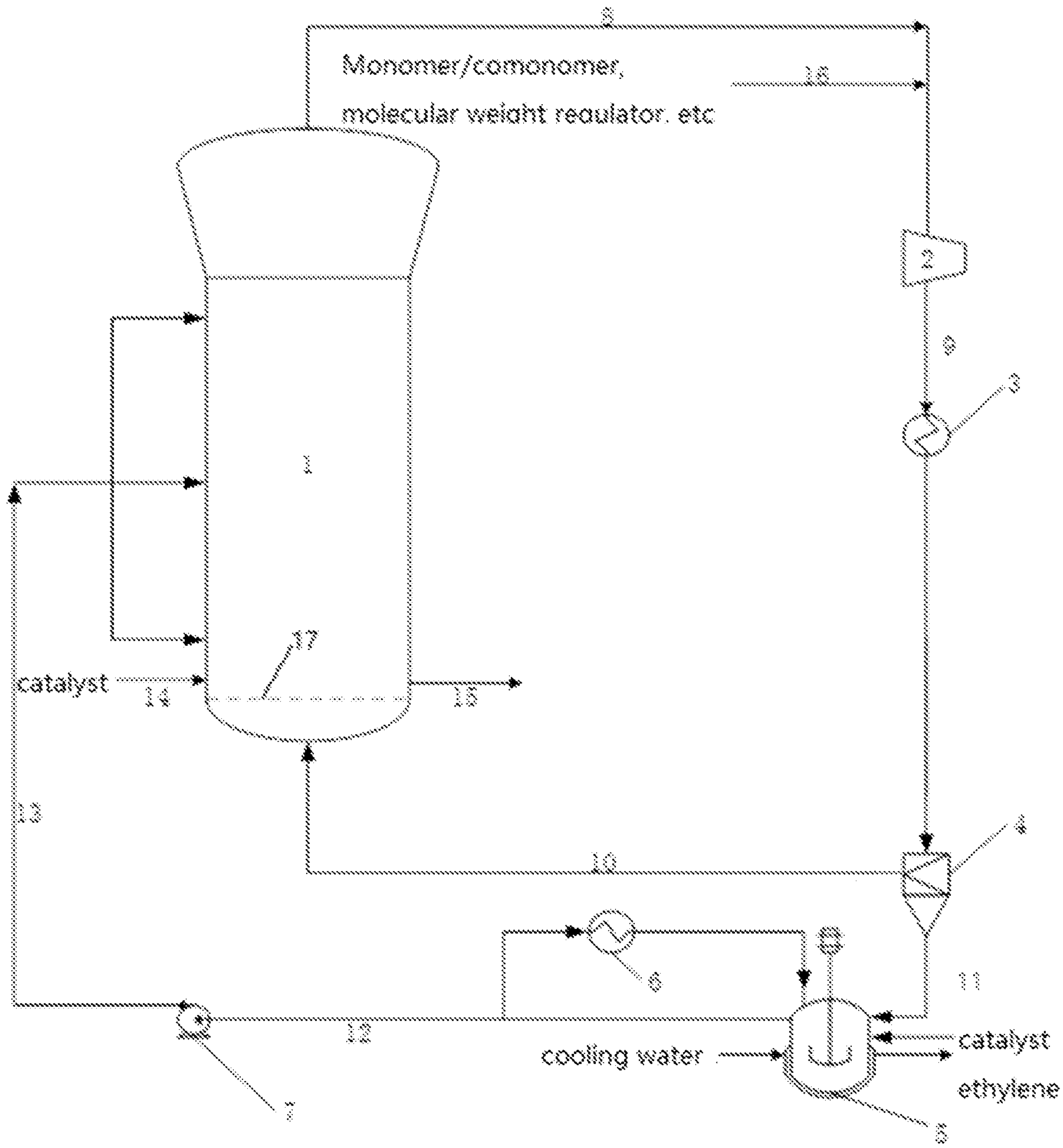
FIG. 1 is a simplified flow chart of a system for olefin polymerization according to one embodiment of the present application.
Figure 2:
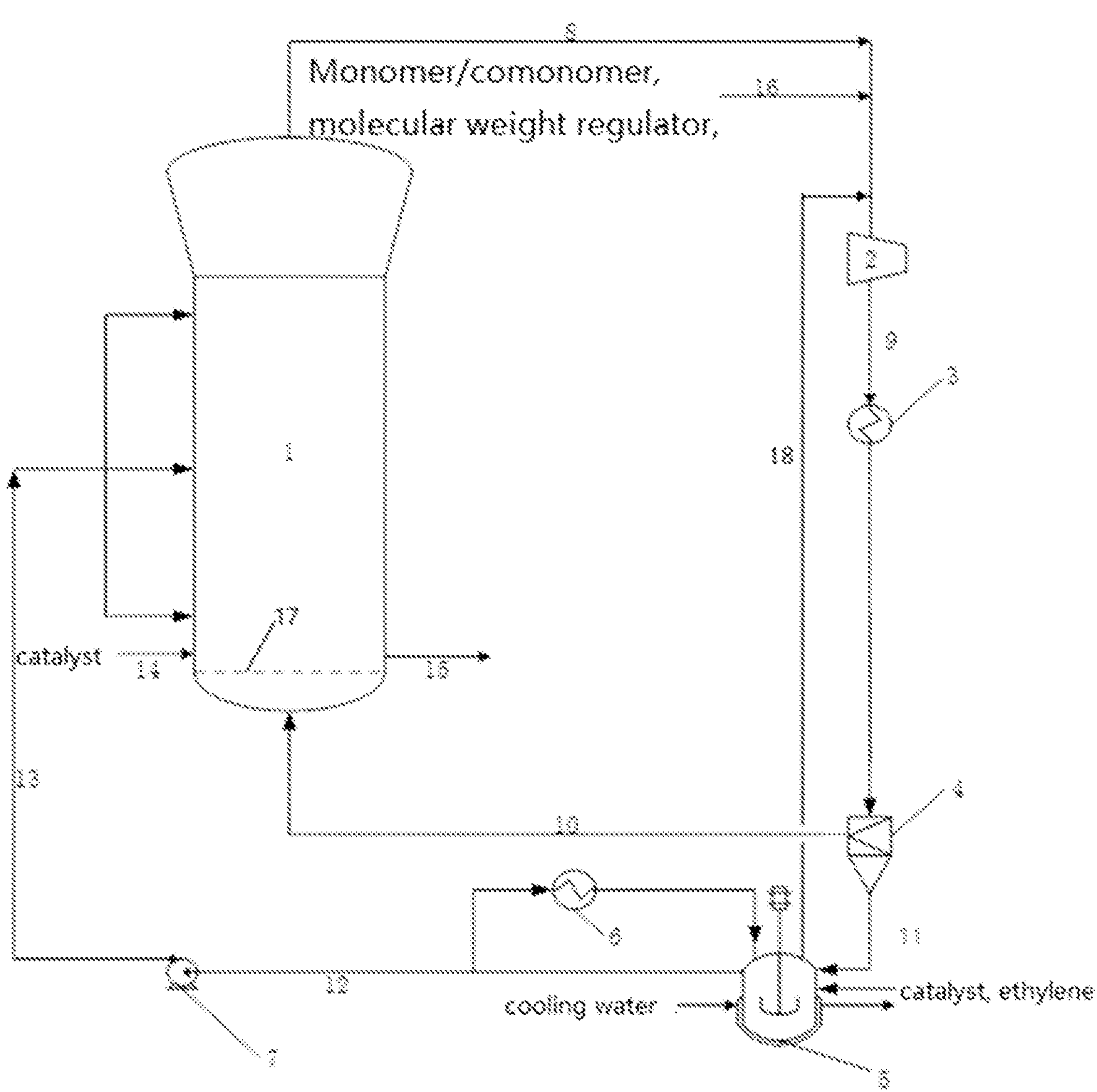
FIG. 2 is a simplified flow chart of a system for olefin polymerization according to another embodiment of the present application.

The meanings of the reference numerals are as follows: 1. a second reactor; 2. compressor; 3. a first heat exchanger; 4. gas-liquid separator; 5. the first reactor; 6. a second heat exchanger; 7. feed pump; 8. gas circulation loop; 9. conveying pipeline; 10 a first fluid pipeline; 11. a second fluid pipeline; 12. a third fluid pipeline, 13. a fourth fluid pipeline; 14. a fifth fluid pipeline; 15. a sixth fluid pipeline; 16. a seventh fluid pipeline; 17. gas distribution plate; 18. a eighth fluid pipeline.

DETAILED DESCRIPTION OF EMBODIMENTS

In order to make the present application easy to understand, the present application will be described in detail with reference to examples and drawings. These examples are for illustrative purposes only and are not limited to application scope of the present application. Unless otherwise specified, the raw materials or components used in the present application can be prepared by commercial means or conventional methods.

A first aspect of the present application relates to an olefin polymerization method, comprising the following steps:

- S1, compressing and condensing circulation gas flow comprising an olefin and a condensing agent exported from an outlet of a second reactor to obtain a gas-liquid mixture; carrying out gas-liquid separation of the gas-liquid mixture to obtain a gas material and a liquid material, wherein the liquid material comprises a first liquid material and a second liquid material having the same or different compositions;
- S2, conveying the gas material and the first liquid material back to the second reactor for circulation, introducing the second liquid material into a first reactor, simultaneously conveying ethylene and a catalyst into the first reactor, and polymerizing the olefin in contact with the catalyst in the first reactor to form a mixture comprising a first polyolefin;
- S3, leading out the mixture comprising the first polyolefin from the first reactor and separating the mixture into at least a first mixture and a second mixture having the same or different compositions; conveying the first mixture back into the first reactor after heat exchange, and pumping the second mixture into the second reactor; and
- S4, performing polymerization reaction of the olefins in the second mixture, the gas material and the first liquid material in the second reactor where the olefins are in contact with the catalyst to generate a second polyolefin, thereby forming a polymerization product comprising the first polyolefin and the second polyolefin.

In some embodiments of the present application, the circulation gas flow further comprises one or more of a cocatalyst, a molecular weight regulator, an antistatic agent, and inert gas.

In other embodiments of the present application, in the polymerization process, a feeding position of polymerization raw materials including the olefin, the condensing agent, the cocatalyst, the molecular weight regulator, the antistatic agent and the inert gas is one or more of the first reactor, the second reactor, and the gas circulation loop; and the gas circulation loop is located between the second reactor and a compressor which is used for compressing the circulation gas flow. That is, the polymerization raw materials can be directly introduced into the first reactor and/or the second reactor, and can also be introduced into the gas circulation loop; part of the polymerization raw materials can also be introduced into the first reactor and/or the second reactor, and the other part can be introduced into the gas circulation loop.

In some embodiments of the present application, the molecular weight regulator is selected from the group consisting of ethane, propane, butane, hexane and cyclohexane in alkanes, propylene, isobutylene in olefins, and hydrogen or acetone; preferably, the molecular weight regulator is hydrogen.

In some embodiments of the present application, the catalyst is a supported dual catalysts; preferably, the supported dual catalysts is a mixture of metallocene or late transition metal catalyst and a Ziegler-Natta catalyst; further preferably, the mass ratio of the metallocene or late transition metal catalyst to the Ziegler-Natta catalyst is 0.1-10. In the first reactor, metallocene or late transition metal catalyst functions in catalyzing olefin polymerization to generate first polyolefin with high molecular weight and high branching degree. The activity of the catalyst in the first reactor is released immediately, with rapid reaction and short residence time; in the second reactor, the Ziegler-Natta catalyst functions in further catalyzing olefin polymerization in the reaction raw materials to generate a second polyolefin with low molecular weight and low branching degree, thus obtaining olefin polymers comprising both the first polyolefin and the second polyolefin and thus having wide molecular weight distribution, good compatibility and excellent performance. In the present application, the "reaction raw material" refers to the mixture of the second mixture, the gas material and the first liquid material entering the second reactor.

In other embodiments of the present application, in step S1, the content of liquid phase in the gas-liquid mixture is 5-50 wt %, preferably 10-25 wt %.

In some embodiments of the present application, in step S1, the second liquid material accounts for 30-100 wt % of the liquid material.

In other embodiments of the present application, in step S2, the ratio of the mass of ethylene conveyed into the first reactor to the total mass of polyolefin produced in the first reactor and the second reactor is 0.0001-1.

In some embodiments of the present application, the mass ratio of the first polyolefin to the second polyolefin is (0-3): 7 or (1-7): 3.

In other embodiments of the present application, in the first reactor reaction pressure is 1.0-10 MPa and reaction temperature is 40-100° C.; and/or in the second reactor reaction pressure is 0.5-9.5 MPa and reaction temperature is 60-120° C.

In some embodiments of the present application, the olefin is at least one of ethylene and α-olefin; preferably, the α-olefin is one or more of $C_4$-$C_{18}$ α-olefin; further preferably, the α-olefin is selected from the group consisting of butene, hexane, and octane.

In other embodiments of the present application, the condensing agent is selected from the group consisting of $C_4$-$C_8$ straight-chain or branched-chain alkanes and $C_4$-$C_8$ cycloalkanes; preferably the condensing agent is selected from the group consisting of n-pentane, i-pentane, n-hexane, cyclohexane, and n-heptane.

In some embodiments of the present application, the cocatalyst is selected from the group consisting of modified aluminoxane, monochlorodiethyl aluminum, monochlorodiisobutyl aluminum, monochlorosesquiethyl aluminum, diisobutyl aluminum, dichloromonoethyl aluminum, trimethyl aluminum, triethyl aluminum, triisobutyl aluminum, trioctyl aluminum, monohydrodiethyl aluminum, and monohydrodiisobutyl aluminum; preferably triethylaluminum and/or triisobutyl aluminum.

In other embodiments of the present application, the antistatic agent is selected from the group consisting of aluminum distearate, ethoxylated amine, polysulfone copolymer, polymeric polyamine, and oil-soluble sulfonic acid. In the embodiments disclosed by the present application, if the antistatic agent is used, proper antistatic agent must be carefully selected to avoid introducing poisons into the reactor, and at the same time, the minimum amount of antistatic agent is used to make the static charge in the reactor fall within a desired range.

In some embodiments of the present application, the inert gas is a conventional inert gas, such as nitrogen.

In other embodiments of the present application, the gas at the top of the first reactor is discharged and returned to the gas circulation loop, when the pressure in the first reactor is higher than a predetermined pressure, wherein the gas circulation loop is located between the second reactor and the compressor, and the compressor is used for compressing the circulation gas flow.

In some embodiments of the present application, the polymerization product comprising the first polyolefin and the second polyolefin is continuously or intermittently discharged from the second reactor.

A second aspect of the present application relates to a system for implementing the method according to the first aspect of the present application, which comprises:

- a first reactor and a second reactor for olefin polymerization, wherein a compressor, a first heat exchanger and a gas-liquid separator are sequentially arranged between an outlet at the top of the second reactor and a first top inlet of the first reactor;
- an liquid outlet of the gas-liquid separator is connected with the first top inlet of the first reactor through a fluid pipeline; a gas outlet of the gas-liquid separator is connected with a bottom inlet of the second reactor through a fluid pipeline; and
- the first top outlet of the first reactor is respectively connected with a middle inlet of the second reactor and a second top inlet of the first reactor.

In some embodiments of the present application, a feed pump is arranged between the first top outlet of the first reactor and the middle inlet of the second reactor for pumping a second mixture discharged from the first reactor into the second reactor.

In other embodiments of the present application, a second heat exchanger is arranged between the first top outlet of the first reactor and the second top inlet of the first reactor.

In some embodiments of the present application, the outlet at the top of the second reactor is connected with the compressor through a gas circulation loop.

In other embodiments of the present application, an inlet is provided at the middle part of the first reactor for conveying ethylene and a catalyst.

In some embodiments of the present application, an outlet is provided at the bottom of the second reactor for discharging polymerization products.

In other embodiments of the present application, the second top outlet of the first reactor is connected with the gas circulation loop, which is used for discharging the gas at the top of the first reactor and returning the gas to the gas circulation loop when the pressure in the first reactor is too high.

In some embodiments of the present application, the first reactor is a stirred tank reactor.

In some other embodiments of the present application, the second reactor is a fluidized bed reactor; and preferably, a gas distribution plate is arranged at the bottom of the second reactor.

In some embodiments of the present application, the first heat exchanger and the second heat exchanger are independently selected from a jacket heat exchanger, a shell-and-tube heat exchanger, or a plate heat exchanger.

In other embodiments of the present application, the gas-liquid separator is selected from a buffer tank separator, a cyclone separator or a cyclone separator.

Specifically, the system comprises:

- a second reactor 1 for olefin polymerization:
- a compressor 2 for maintaining the flow of the circulation air flow in the pipeline;
- a first heat exchanger 3 for cooling the circulation gas flow from the outlet of the second reactor;
- a gas-liquid separator 4 for separating condensate from the gas-liquid mixture at the outlet of the first heat exchanger 3;
- a first reactor 5 for olefin polymerization, the first reactor is a stirred tank reactor;
- a second heat exchange 6 for removing the heat generated in the first reactor 5;
- a feed pump 7 for introducing the second mixture comprising the reaction materials and the first polyolefin produced by the reaction in the first reactor 5 into the second reactor 1;
- a gas circulation loop 8 for conveying the circulation gas flow from the outlet of the second reactor 1 to the compressor 2;
- a conveying pipeline 9 for conveying the materials compressed by the compressor 2 into the first heat exchanger 3;
- a first fluid pipeline 10 for introducing the gas material and the first liquid material separated in the gas-liquid separator 4 into the second reactor 1;
- a second fluid pipeline 11 for introducing the second liquid material separated by the gas-liquid separator 4 into the first reactor 5;
- a third fluid pipeline 12 for introducing the second mixture into the feed pump 7;
- a fourth fluid pipeline 13 for introducing the second mixture pumped by the feed pump into the second reactor 1;
- a fifth fluid pipeline 14 for introducing the catalyst above a distribution plate 17 of the second reactor 1;

a sixth fluid pipeline 15 for taking out olefin polymerization products from the second reactor 1;

a seventh fluid pipeline 16 for continuously supplying polymerization raw materials to the reaction system;

the gas distribution plate 17 for uniformly distributing gas in the second reactor 1; and optionally, an eighth fluid pipeline 18 for returning a portion of the gas discharged from the other top outlet of the first reactor 5 to the gas circulation loop 8.

The process of carrying out olefin polymerization using the above system is as follows: the material (a mixture of the gas material and the first liquid material) discharged from a gas outlet of the gas-liquid separator enters the reaction zone of the second reactor 1 from the gas distribution zone at the bottom of the second reactor 1 through the gas distribution plate 17; olefin in the reaction material in the second reactor 1 makes contact with the introduced catalyst and reacts to generate solid-phase polyolefin products, which are taken out intermittently or continuously from the sixth fluid pipeline 15; unreacted circulation gas flow is led out from the top of the second reactor 1, enters the gas circulation circuit 8, flows through the compressor 2 and the first heat exchanger 3 from which the partially condensed gas-liquid mixture enters the gas-liquid separator 4; 30%-100% of the liquid material (the second liquid material) enters the first reactor 5, and the unseparated liquid material (the first liquid material) enter the gas distribution area of the second reactor 1 along with the gas material to complete a circulation. Part of the mixture from the outlet of the first reactor 5 (the first mixture) is, after heat exchange by the second heat exchanger 6, sent back to the first reactor 5, and the other part of the mixture (the second mixture) is sent to the second reactor 1 for reaction by the feed pump 7, for supplementing fresh polymerization raw materials containing comonomer, molecular weight regulator, etc., while introducing the catalyst into polymerization system, wherein polymeric monomers and comonomers in the reaction raw materials contact with the catalyst to generate polyolefin. In addition, when the pressure in the first reactor 5 is higher than a predetermined pressure, the gas portion at the top of the first reactor 5 is returned to the gas circulation circuit 8 through the added eighth fluid pipe 18.

EXAMPLES

In the following examples, the methods for characterizing the structure and properties of olefin polymers are as follows:

(1) melt index: measuring the melt flow rate according to GB/T-3682-2000 (190° C., with a load of 2.16 kg), usually recorded as MI2.16.

(2) density: determined according to GB/1033-1986.

Example 1

Olefin polymerization was carried out in the system shown in FIG. 1. Under the action of a Z—N catalyst system, polymerization reaction was carried out at temperature of 88° C. and a pressure of 2.3 MPa, ethylene and hexene underwent binary copolymerization in the second reactor (fluidized bed reactor), and the apparent velocity of reaction material was 0.67 m/s. The circulation gas flow in the gas circulation loop 8 included hydrogen, nitrogen, ethylene, isopentane, and hexene, with a temperature of 88° C. and a pressure of 2.3 MPa. Unreacted circulation gas flow was taken out from the top outlet of the second reactor 1, introduced into the inlet of the compressor 2, and after heat exchange by the first heat exchanger 3 (e.g., a fixed tube-plate heat exchanger), the circulation gas flow was partially condensed, the liquid phase in the gas-liquid mixture accounted for 80.0 wt % of the circulation gas flow, the gas-liquid mixture underwent gas-liquid separation in the gas-liquid separator 4, about 21 wt % of liquid materials (the second liquid material) entered the first reactor 5, and the rest liquid material (first liquid material) returned to the second reactor 1 along with the gas material. Reaction took place in the first reactor under catalytic action by a late-transition metal catalyst to generate a first polyethylene with high molecular weight and high branching degree, and the second mixture discharged from the first reactor 5 was led back to the second reactor 1 through the feed pump 7, and further polymerization reaction was carried out in the second reactor 1 to generate a second polyolefin with low molecular weight and low branching degree. The catalyst was introduced into the second reactor 1 through the fluid pipeline 14 to form a circulation loop. The first reactor 5 had a temperature of 60° C. and a pressure of 4 MPa. The mass ratio of production capacity of the first reactor to the second reactor is 1:4.

See table 1 for the polymerization process conditions of example 1 and the performance characterization results of the prepared olefin polymerization product A.

Comparative Example 1

Olefin polymerization was carried out in the system shown in FIG. 1. Under the action of Z—N catalyst system, polymerization reaction was carried out at temperature of 88° C. and a pressure of 2.3 MPa, ethylene and hexene underwent binary copolymerization in the second reactor (a fluidized bed reactor), and the apparent velocity of reaction material was 0.67 m/s. The circulation gas flow in the gas circulation loop 8 included hydrogen, nitrogen, ethylene, isopentane and hexene, with a temperature of 88° C. and a pressure of 2.3 MPa. Unreacted circulation gas flow was taken out from the top outlet of the second reactor 1, introduced into the inlet of the compressor 2, and then passed through the first heat exchanger 3 (e.g., a fixed tube-plate heat exchanger) for heat exchange, and was cooled down without generating condensate fluid, and the valves of the second fluid pipeline 11 and the fourth fluid pipeline 13 were closed, so that the circulation gas flow directly entered the bottom of the second reactor 1 through the first fluid pipeline 10. The circulation gas flow made contact with the catalyst in the second reactor 1 to generate olefin polymers.

See table 1 for the polymerization process conditions of the comparative example 1 and the performance characterization results of the prepared olefin polymerization product B.

TABLE 1

| Gas Phase Method | | Olefin Polymerization Method in the Application | |
|---|---|---|---|
| Pressure of the Reactor/ Mpa | 2.3 | First Reactor/Mpa | 4 |
| | | Second Reactor/Mpa | 2.3 |

TABLE 1-continued

| Gas Phase Method | | | Olefin Polymerization Method in the Application | | | | | |
|---|---|---|---|---|---|---|---|---|
| Temperature of the Reactor/° C. | | 88 | Temperature of the First Reactor/° C. | | | | 60 | |
| | | | Temperature of the Second Reactor/° C. | | | | 88 | |
| Material Composition/% (Molar Ratio) | Ethylene | 32.87 | Material Composition in the First Reactor/% (Molar Ratio) | Ethylene | 9.0182 | Material Composition in the Second Reactor/% (Molar Ratio) | Ethylene | 20.5565 |
| | Hexene | 1.30 | | Hexene | 9.5840 | | Hexene | 0.9752 |
| | Hydrogen | 15.54 | | Hydrogen | 0.3418 | | Hydrogen | 15.32 |
| | Nitrogen | 42.25 | | Nitrogen | 2.5447 | | Nitrogen | 50.89 |
| | Isopentane | 5 | | Isopentane | 78.2110 | | Isopentane | 11.25 |
| | Methane | 3.04 | | Methane | 0.3003 | | Methane | 1.0083 |
| $H_2/C_2$ | | 0.4728 | First Reactor | $H_2/C_2$ | 0.03790 | Second Reactor | $H_2/C_2$ | 0.7453 |
| $C_6/C_2$ | | 0.03955 | | $C_6/C_2$ | 1.0627 | | $C_6/C_2$ | 0.04744 |
| Melt Index of Products/g/10 min | | 9.90 | Melt Index of Products in the First Reactor/g/10 min | | | | 0.4669 | |
| | | | Melt Index of Products in the Second Reactor/g/10 min | | | | 20.00 | |
| | | | Melt Index of Products/g/10 min | | | | 9.43 | |
| Product Density/(g/Cm$^3$) | | 0.943 | Product Density in the First Reactor/(g/Cm$^3$) | | | | 0.930 | |
| | | | Product Density in the Second Reactor/(g/Cm$^3$) | | | | 0.945 | |
| | | | Product Density/(g/Cm$^3$) | | | | 0.942 | |

It can be seen from Table 1 that the products obtained by the two polyolefin production methods are very close in terms of melt index and density, but it is obvious that the products obtained by the polymerization method in the present application are a combination of two polyolefins with significant differences in density and melt index, so that the product performance is improved.

Example 2

Olefin polymerization was carried out in the system shown in FIG. 1. Under the action of a Z—N catalyst system, polymerization reaction was performed at 88° C. and 2.3 MPa, ethylene and hexene underwent binary copolymerization reaction in a fluidized bed reactor, and the apparent velocity of reaction material is 0.63 m/s. The circulation gas flow in the gas circulation loop 8 included hydrogen, nitrogen, ethylene, isobutane and hexene, with a temperature of 88° C. and a pressure of 2.3 MPa. Unreacted circulation gas flow was taken out from the top outlet of the second reactor 1, introduced into the inlet of the compressor 2, and after heat exchange by the first heat exchanger 3 (e.g., a fixed tube-plate heat exchanger), was partially condensed, the liquid phase in the gas-liquid mixture accounts for 82.0 wt % of the circulation gas flow, the gas-liquid mixture underwent gas-liquid separation in the gas-liquid separator 4, about 24 wt % of the liquid material (the second liquid material) entered the second reactor 5, and the rest liquid material (the first liquid material) returned to the second reactor 1 along with the gas material. Reaction was carried out in the first reactor 5 under the catalysis of the late transition metal catalyst to generate a first polyethylene with high molecular weight and high branching degree, and the second mixture in the first reactor 5 is fed back to the second reactor 1 through the feed pump 7, and further polymerization reaction was carried out in the second reactor 1 to generate a second polyethylene with low molecular weight and low branching degree. The catalyst was introduced into the second reactor 1 through the fluid pipeline 14 to form a circulation loop. The first reactor 2 had a temperature of 60° C. and a pressure of 4 MPa. Mass ratio of capacity of the first reactor to the second reactor was 1:4.

See Table 2 for the polymerization process conditions of Example 2 and the performance characterization results of the prepared olefin polymerization product C.

Comparative Example 2

Olefin polymerization was carried out in the system shown in FIG. 1. Under the action of a Z—N catalyst system, polymerization reaction was performed at 88° C. and 2.3 MPa, ethylene and hexene underwent binary copolymerization reaction in a fluidized bed reactor, and the apparent velocity of reaction material is 0.63 m/s. The circulation gas flow in the gas circulation loop 8 included hydrogen, nitrogen, ethylene, isobutene, and hexene, with a temperature of 88° C. and a pressure of 2.3 MPa. Unreacted circulation gas flow was taken out from the top outlet of the second reactor 1, introduced into the inlet of the compressor 2, and after heat exchange by the first heat exchanger 3 (e.g., a fixed tube-plate heat exchanger), was cooled down without generating condense liquid. The valves of the second fluid pipeline 11 and the fourth fluid pipeline 13 were closed, so that the circulation gas flow directly entered the bottom of the second reactor 1 through the first fluid pipeline 10. The circulation gas flow made contact with the catalyst in the second reactor 1 to generate olefin polymers.

See table 2 for the polymerization process conditions of comparative example 2 and the performance characterization results of the prepared olefin polymerization product D.

TABLE 2

| Gas Phase Method | | | Olefin Polymerization Method in the Application | | | | | |
|---|---|---|---|---|---|---|---|---|
| Pressure of the Reactor/Mpa | | 2.3 | First Reactor/Mpa | | | | 4 | |
| | | | Second Reactor/Mpa | | | | 2.3 | |
| Temperature of the Reactor/° C. | | 88 | Temperature of the First Reactor/° C. | | | | 60 | |
| | | | Temperature of the Second Reactor/° C. | | | | 88 | |
| Material Composition/ | Ethylene | 32.87 | Material Composition | Ethylene | 9.2587 | Material Composition | Ethylene | 20.5554 |
| | Hexene | 1.30 | | Hexene | 7.3401 | | Hexene | 0.9752 |

TABLE 2-continued

| Gas Phase Method | | | Olefin Polymerization Method in the Application | | | | | |
|---|---|---|---|---|---|---|---|---|
| % (Molar Ratio) | Hydrogen | 15.54 | in the First Reactor/% (Molar Ratio) | Hydrogen | 0.4834 | in the Second Reactor/% (Molar Ratio) | Hydrogen | 15.3248 |
| | Nitrogen | 39.25 | | Nitrogen | 2.1310 | | Nitrogen | 33.1446 |
| | Isobutane | 11.04 | | Isobutane | 80.7868 | | Isobutane | 30.0000 |
| $H_2/C_2$ | | 0.4728 | First Reactor | $H_2/C_2$ | 0.05221 | Second Reactor | $H_2/C_2$ | 0.7455 |
| $C_6/C_2$ | | 0.03955 | | $C_6/C_2$ | 0.79288 | | $C_6/C_2$ | 0.04744 |
| Melt Index of Products/g/10 min | | 9.90 | Melt Index of Products in the First Reactor/g/10 min | | | | 0.5954 | |
| | | | Melt Index of Products in the Second Reactor/g/10 min | | | | 20 | |
| | | | Melt Index of Products/g/10 min | | | | 9.90 | |
| Product Density/ ($g/cm^3$) | | 0.943 | Product Density in the First Reactor/ ($g/cm^3$) | | | | 0.932 | |
| | | | Product Density in the Second Reactor/($g/cm^3$) | | | | 0.945 | |
| | | | Product Density/($g/cm^3$) | | | | 0.942 | |

It can be seen from Table 2 that the products obtained by the two polyolefin production methods are very close in terms of melt index and density, but it is obvious that the products of the polymerization method proposed in the present application are a combination of two products with significant differences in density and melt index, and the product performance is improved.

Example 3

Olefin polymerization was carried out in the system shown in FIG. 1. The compositions of the gas material and the second liquid material obtained under different conditions are obtained by changing the content of condensing agent (hexane and isopentane) in the circulation gas flow and the temperature of the first heat exchanger respectively, as shown in FIGS. 3-5.

Figure 3:
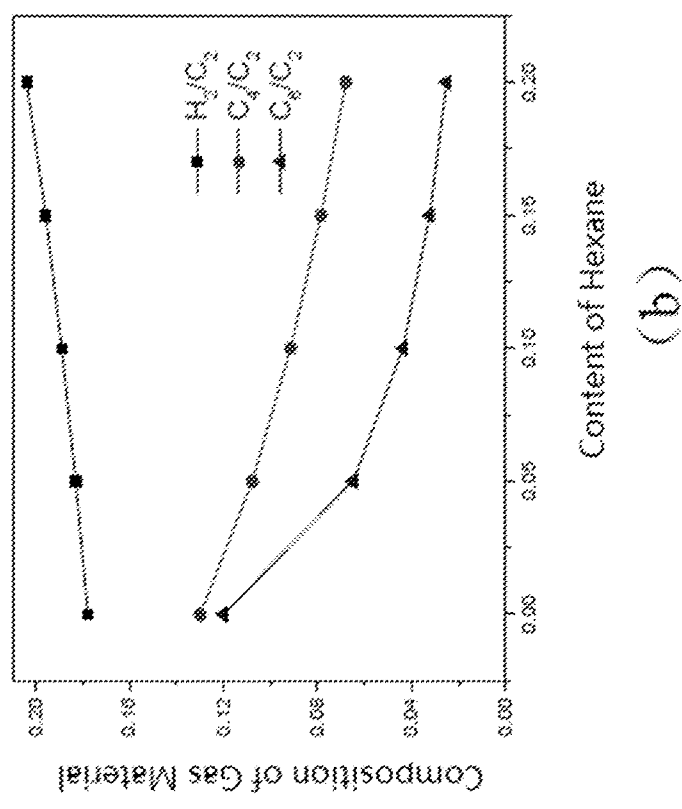
FIG. 3 is a graph showing the relationship between the composition of gas material/liquid material and the content of the condensing agent after the circulation gas flow is condensed and subjected to gas-liquid separation according to an embodiment of the present application, wherein the condensing agent is hexane.
Figure 3:
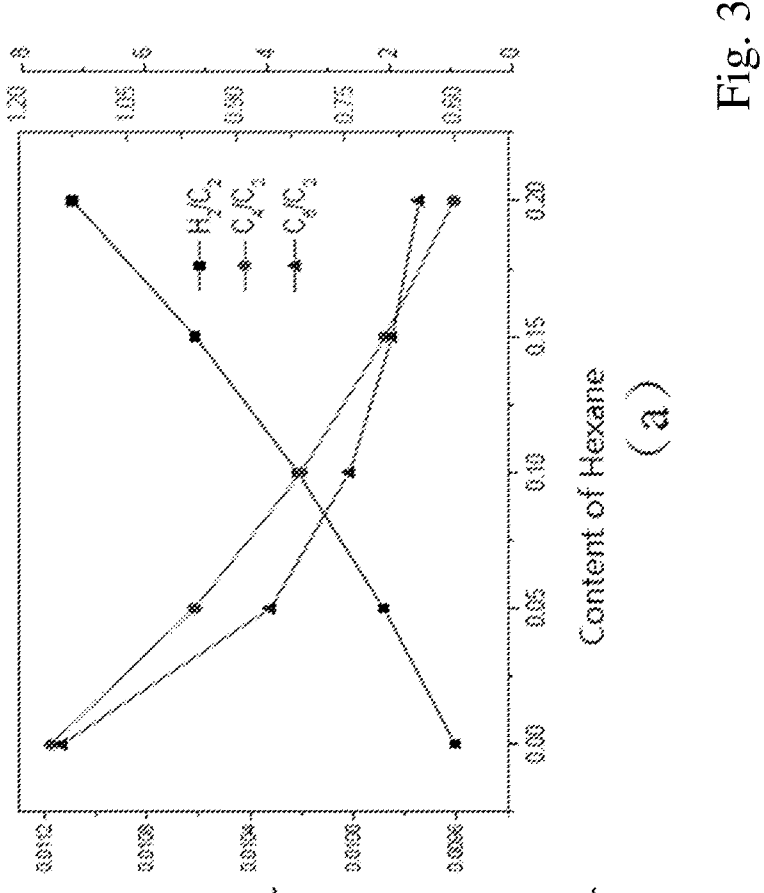

It can be seen from FIG. 3 that with the change of the content of hexane, the ratio of hydrogen to ethylene is significantly different from $C_6/C_2$ in the gas material and the second liquid material, which shows that the change of the content of the condensate has a great influence on polymerization, and polyolefin with different molecular weight distribution can be obtained by changing the condensate content.

Figure 4:
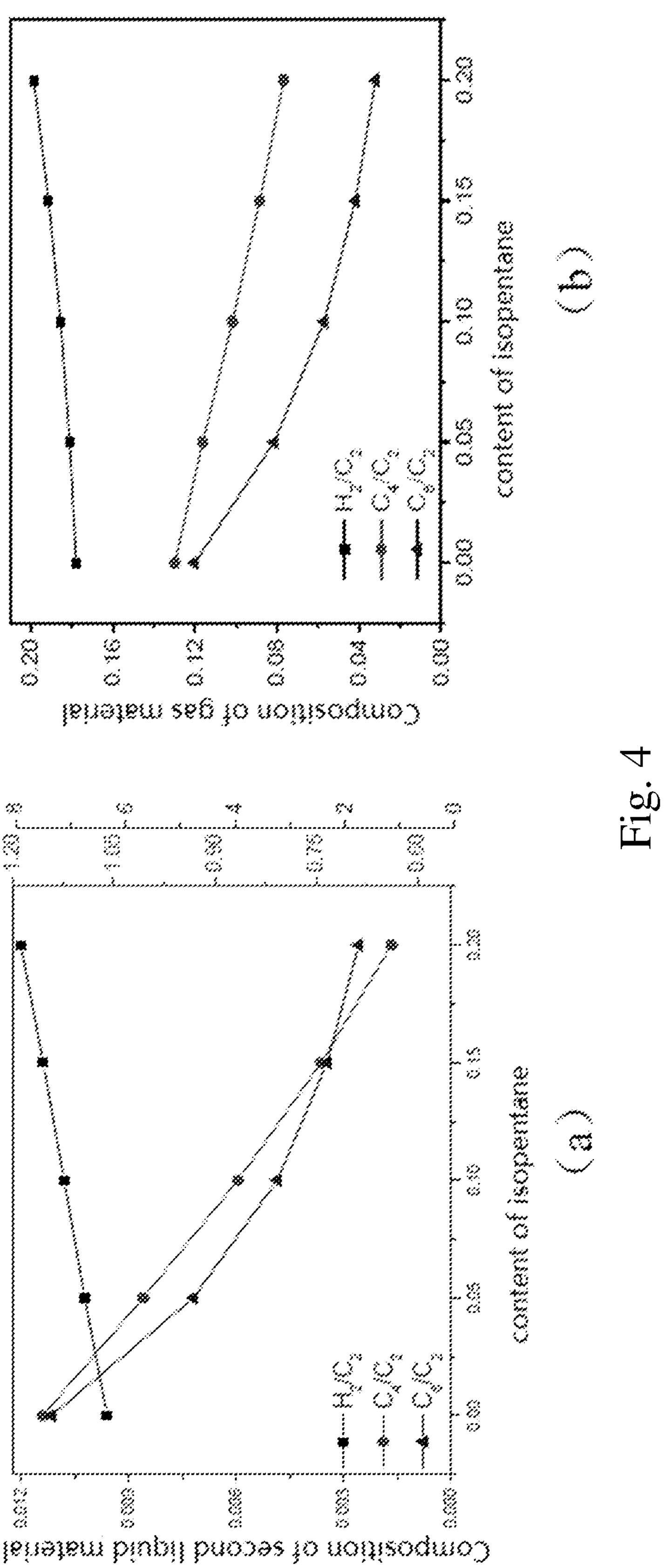
FIG. 4 is a graph showing the relationship between the composition of gas material/liquid material and the content of the condensing agent after the circulation gas flow is condensed and subjected to gas-liquid separation according to an embodiment of the present application, wherein the condensing agent is isopentane.

It can be seen from FIG. 4 that with the change of the content of isopentane, the ratio of hydrogen to ethylene is significantly different from $C_6/C_2$ in the gas material and the second liquid material, which shows that the change of the content of the condensate has a great influence on polymerization, and polyethylene with different molecular weight distribution can be obtained by changing the condensate content.

Figure 5:
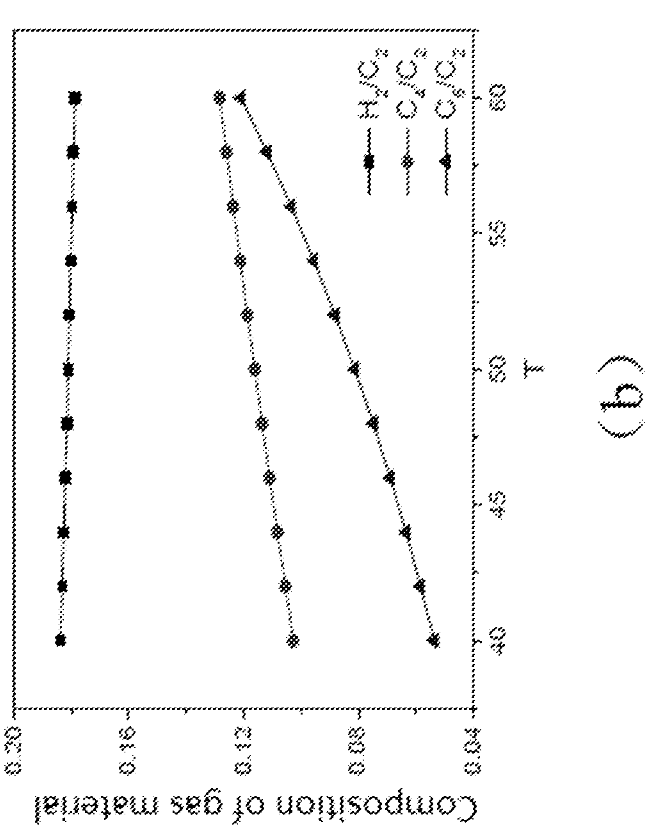
FIG. 5 is a graph showing the relationship between the composition of gas material/liquid material and the temperature of the first reactor after the circulation gas flow is condensed and subjected to gas-liquid separation according to an embodiment of the present application.
Figure 5:
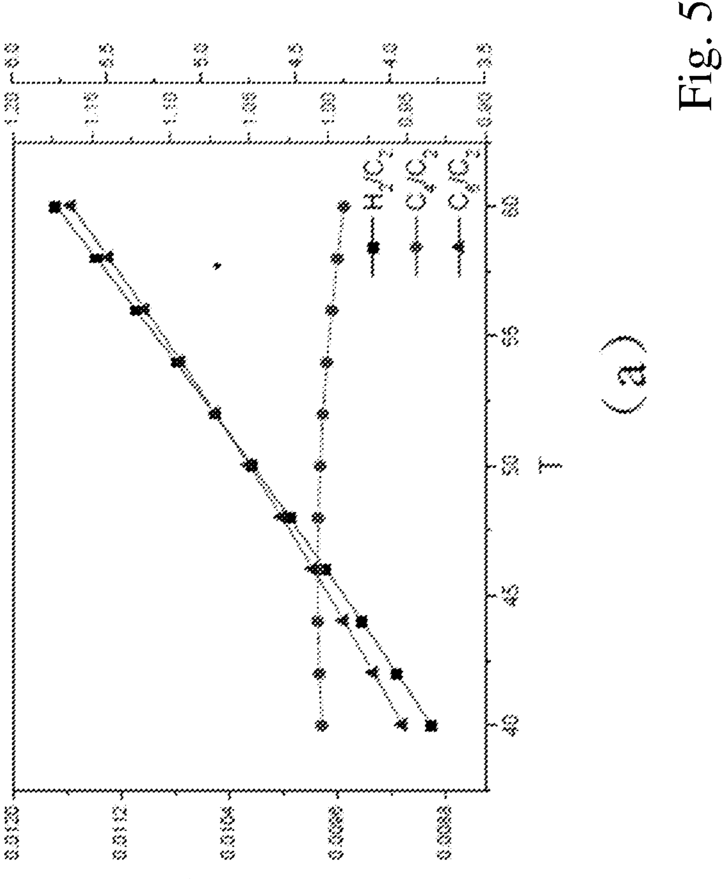

It can be seen from FIG. 5 that with the change of the temperature in the heat exchanger, the components in the gas material and the second liquid material change greatly, indicating that the change of temperature has a great influence on the polymerization, and polyethylene with different molecular weight distributions can be obtained by changing the temperature.

It should be noted that the above-mentioned examples are only used to explain the present application, and do not constitute any restriction on the present application. The present application has been described with reference to typical examples, but it should be understood that the words used therein are descriptive and explanatory, not restrictive. The present application can be modified within the scope of the claims and without departing from the scope and spirit of the present application. Although the present application described therein relates to specific methods, materials and examples, it does not mean that the present application is limited to the specific examples disclosed therein, but on the contrary, can be extended to all other methods and applications with the same function.

The invention claimed is:

1. An olefin polymerization method, comprising the following steps:

S1, compressing and condensing circulation gas flow comprising an olefin and a condensing agent exported from an outlet of a second reactor to obtain a gas-liquid mixture; carrying out gas-liquid separation of the gas-liquid mixture to obtain a gas material and a liquid material, wherein the liquid material comprises a first liquid material and a second liquid material having the same or different compositions;

S2, conveying the gas material and the first liquid material back to the second reactor for circulation, introducing the second liquid material into a first reactor, simultaneously conveying ethylene and a catalyst into the first reactor, and polymerizing the olefin in contact with the catalyst in the first reactor to form a mixture comprising a first polyolefin;

S3, leading out the mixture comprising the first polyolefin from the first reactor and separating the mixture into at least a first mixture and a second mixture having the same or different compositions; conveying the first mixture back into the first reactor after heat exchange, and pumping the second mixture into the second reactor; and S4, performing polymerization reaction of olefins in the second mixture, the gas material and the first liquid material in the second reactor where the olefins are in contact with the catalyst to generate a second polyolefin, thereby forming a polymerization product comprising the first polyolefin and the second polyolefin;

wherein, in the first reactor reaction pressure is 1.0-10 MPa and reaction temperature is 40-60° C.;

in the second reactor reaction pressure is 0.5-9.5 MPa and reaction temperature is 60-120° C.;

in step S2 and step S4, the catalyst is a supported dual catalyst which is a mixture of a metallocene or late transition metal catalyst and a Ziegler-Natta catalyst, the mass ratio of the metallocene or late transition metal catalyst to the Ziegler-Natta catalyst is 0.1-10;

in the first reactor, the metallocene or late transition metal catalyst functions in catalyzing olefin polymerization to generate the first polyolefin with high molecular weight and high branching degree; in the second reactor, the Ziegler-Natta catalyst functions in further catalyzing olefin polymerization in the reaction raw materials to generate a second polyolefin with low molecular weight and low branching degree;

in step S2, the ratio of the mass of ethylene conveyed into the first reactor to the total mass of polyolefin produced in the first reactor and the second reactor is 0.0001-1.

2. The method according to claim 1, wherein the circulation gas flow also comprises one or more of a cocatalyst, a molecular weight regulator, an antistatic agent, and inert gas.

3. The method according to claim 1, wherein a feeding position of polymerization raw materials including the olefin, the condensing agent, the cocatalyst, the molecular weight regulator, the antistatic agent and the inert gas is selected from one or more of the first reactor, the second reactor, and a gas circulation loop; and the gas circulation loop is located between the second reactor and a compressor which is used for compressing the circulation gas flow.

4. The method according to claim 1, wherein in step S1, the content of liquid phase in the gas-liquid mixture is 5-50 wt % or 10-25 wt %.

5. The method according to claim 1, wherein in step S1, the second liquid material accounts for 30-100 wt % of the liquid material.

6. The method according to claim 1, wherein the mass ratio of the first polyolefin to the second polyolefin is (0-3):7 or (1-7):3, and the mass of the first polyolefin is not zero.

7. The method according to claim 1, wherein the olefin is at least one of ethylene and α-olefin.

8. The method according to claim 1, wherein the condensing agent is selected from the group consisting of $C_4$-$C_8$ straight-chain or branched-chain alkanes, and $C_4$-$C_8$ cycloalkanes; and the cocatalyst is selected from the group consisting of modified aluminoxane, monochlorodiethyl aluminum, monochlorodiisobutyl aluminum, monochlorosesquiethyl aluminum, diisobutyl aluminum, dichloromonoethyl aluminum, trimethyl aluminum, triethyl aluminum, triisobutyl aluminum, trioctyl aluminum, monohydrodiethyl aluminum and monohydrodiisobutyl aluminum; and the antistatic agent is selected from the group consisting of aluminum distearate, ethoxylated amine, polysulfone copolymer, polymeric polyamine, and oil-soluble sulfonic acid.

9. The method according to claim 1, wherein discharging and returning the gas at the top of the first reactor to the gas circulation loop, when the pressure in the first reactor is higher than a predetermined pressure, wherein the gas circulation loop is located between the second reactor and the compressor, and the compressor is used for compressing the circulation gas flow.

10. The method according to claim 1, wherein the polymerization product comprising the first polyolefin and the second polyolefin is continuously or intermittently discharged from the second reactor.

11. The method according to claim 7, wherein the α-olefin is one or more of $C_4$-$C_{18}$ α-olefin.

12. The method according to claim 7, wherein the α-olefin is selected from the group consisting of butene, hexane, and octene.

13. The method according to claim 8, wherein the condensing agent is selected from the group consisting of n-pentane, i-pentane, n-hexane, cyclohexane, and n-heptane; and the cocatalyst is triethyl aluminum and/or triisobutyl aluminum.

* * * * *